(12) United States Patent
Oga et al.

(10) Patent No.: US 12,018,189 B2
(45) Date of Patent: Jun. 25, 2024

(54) COMPOSITION FOR ADHESIVES, OUTER PACKAGE MATERIAL FOR ELECTRICITY STORAGE DEVICES, AND METHOD FOR PRODUCING SAME

(71) Applicant: SHOWA DENKO K.K., Tokyo (JP)

(72) Inventors: Kazuhiko Oga, Tokyo (JP); Takeshi Kawamoto, Tokyo (JP); Kai Suzuki, Tokyo (JP); Ryunosuke Yamamoto, Tokyo (JP)

(73) Assignee: Resonac Corporation, Tokyo (JP)

( * ) Notice: Subject to any disclaimer, the term of this patent is extended or adjusted under 35 U.S.C. 154(b) by 436 days.

(21) Appl. No.: 17/428,823

(22) PCT Filed: Mar. 16, 2020

(86) PCT No.: PCT/JP2020/011391
§ 371 (c)(1),
(2) Date: Aug. 5, 2021

(87) PCT Pub. No.: WO2020/203213
PCT Pub. Date: Oct. 8, 2020

(65) Prior Publication Data
US 2022/0127498 A1    Apr. 28, 2022

(30) Foreign Application Priority Data
Mar. 29, 2019    (JP) .................. 2019-065622

(51) Int. Cl.
*C09J 7/29* (2018.01)
*B32B 7/12* (2006.01)
(Continued)

(52) U.S. Cl.
CPC .................. *C09J 7/29* (2018.01); *B32B 7/12* (2013.01); *B32B 15/085* (2013.01); *B32B 15/20* (2013.01);
(Continued)

(58) Field of Classification Search
CPC ..... B32B 15/085; B32B 15/088; B32B 15/20; B32B 2255/06; B32B 2255/26;
(Continued)

(56) References Cited

U.S. PATENT DOCUMENTS

| | | |
|---|---|---|
| 8,304,920 B2 | 11/2012 | Maeda et al. |
| 2004/0013794 A1 | 1/2004 | Hashimoto et al. |

(Continued)

FOREIGN PATENT DOCUMENTS

| | | |
|---|---|---|
| EP | 1048707 A1 | 11/2000 |
| JP | 2002-245983 A | 8/2002 |

(Continued)

OTHER PUBLICATIONS

International Preliminary Report on Patentability and translation of Written Opinion dated Sep. 28, 2021 from the International Bureau in International Application No. PCT/JP2020/011391.

(Continued)

*Primary Examiner* — Victoria H Lynch
(74) *Attorney, Agent, or Firm* — Sughrue Mion, PLLC

(57) ABSTRACT

Provided are an outer package material that is for electricity storage devices such as batteries and has such a sufficient anti-electrolytic solution property that the time-dependent reduction of the adhesive strength between a metal foil layer and a sealant layer by an electrolytic solution is suppressed over a long time and a composition for adhesives for giving the outer package material. In an outer package material that is for electricity storage devices and has a structure in which at least a base material layer, a first adhesive layer, a metal foil layer, a second adhesive layer, and a sealant layer are stacked in sequence, a composition containing an isocyanato group and a (meth) acryloyl group and further containing an acid-modified polyolefin (component 1), an active energy ray polymerization initiator (component 3), and a solvent (Continued)

(component 4) is used as a composition for adhesives to form the second adhesive layer.

20 Claims, 1 Drawing Sheet

(51) Int. Cl.
| | |
|---|---|
| *B32B 15/085* | (2006.01) |
| *B32B 15/20* | (2006.01) |
| *B32B 27/32* | (2006.01) |
| *C09J 7/38* | (2018.01) |
| *H01M 50/197* | (2021.01) |

(52) U.S. Cl.
CPC .............. *B32B 27/32* (2013.01); *C09J 7/38* (2018.01); *H01M 50/197* (2021.01); *B32B 2255/06* (2013.01); *B32B 2255/26* (2013.01); *B32B 2457/10* (2013.01); *C09J 2203/33* (2013.01); *C09J 2301/16* (2020.08); *C09J 2400/163* (2013.01); *C09J 2475/00* (2013.01)

(58) Field of Classification Search
CPC ........ B32B 2307/518; B32B 2307/748; B32B 2307/752; B32B 2457/10; B32B 27/16; B32B 27/32; B32B 27/34; B32B 37/12; B32B 7/12; C08F 267/04; C08G 18/246; C08G 18/6204; C08G 18/672; C08G 18/725; C08G 18/7664; C08G 18/792; C08G 18/8116; C08G 18/8175; C09J 151/06; C09J 175/04; C09J 2203/33; C09J 2301/16; C09J 2400/163; C09J 2423/00; C09J 2475/00; C09J 4/06; C09J 7/29; C09J 7/38; H01M 50/105; H01M 50/121; H01M 50/1243; H01M 50/1245; H01M 50/129; H01M 50/145; H01M 50/197; Y02E 60/10

See application file for complete search history.

(56) References Cited

U.S. PATENT DOCUMENTS

| | | |
|---|---|---|
| 2011/0104874 A1 | 5/2011 | Maeda et al. |
| 2012/0302041 A1 | 11/2012 | Maeda et al. |
| 2016/0145477 A1* | 5/2016 | Kandori ............... C08G 18/672 |
| | | 156/331.7 |
| 2018/0183017 A1 | 6/2018 | Minamibori |
| 2019/0023954 A1 | 1/2019 | Kouka et al. |
| 2020/0131413 A1 | 4/2020 | Ito et al. |

FOREIGN PATENT DOCUMENTS

| | | |
|---|---|---|
| JP | 2004-66645 A | 3/2004 |
| JP | 2009-242733 A | 10/2009 |
| JP | 2017-201580 A | 11/2017 |
| JP | 2018-107062 A | 7/2018 |
| JP | 2018-147782 A | 9/2018 |
| TW | 201402752 A | 1/2014 |
| TW | 201905144 A | 2/2019 |
| WO | 99/35200 A1 | 7/1999 |
| WO | 2014/061774 A1 | 4/2014 |
| WO | 2017/134931 A1 | 8/2017 |
| WO | 2019/003977 A1 | 1/2019 |
| WO | 2019/139016 A1 | 7/2019 |

OTHER PUBLICATIONS

English Abstract and Machine Translation of Japanese published application No. 2004-66645 published Mar. 4, 2004.
International Search Report for PCT/JP2020/011391 dated Jun. 9, 2020 (PCT/ISA/210).

* cited by examiner

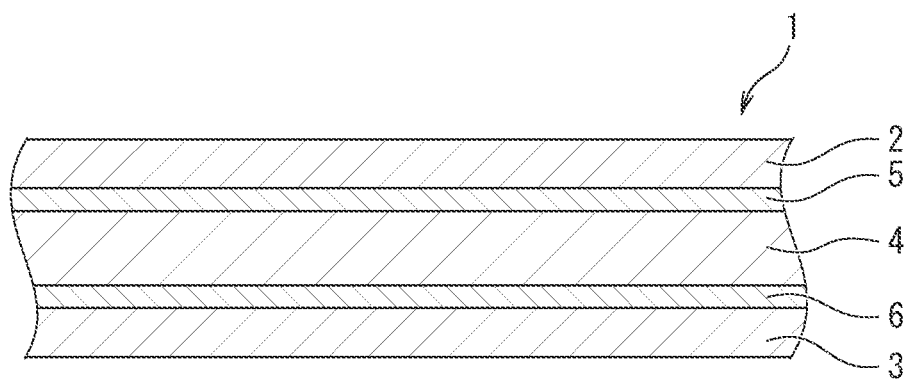

COMPOSITION FOR ADHESIVES, OUTER PACKAGE MATERIAL FOR ELECTRICITY STORAGE DEVICES, AND METHOD FOR PRODUCING SAME

CROSS REFERENCE TO RELATED APPLICATIONS

This application is a National Stage of International Application No. PCT/JP2020/011391 filed Mar. 16, 2020, claiming priority based on Japanese Patent Application No. 2019-065622 filed Mar. 29, 2019.

TECHNICAL FIELD

The present invention relates to a composition for adhesives, an outer package material for electricity storage devices produced by using the composition for adhesives, and a method for producing the outer package material.

BACKGROUND ART

Electricity storage devices include, for example, secondary batteries such as a lithium-ion battery, a nickel hydrogen battery, and a lead storage battery and electrochemical capacitors such as an electric double layer capacitor. Due to downsizing of portable equipment, limitation of installation space, or the like, electricity storage devices are required to be further downsized, and a lithium-ion battery having a high energy density has been drawing attention. As the outer package material used for the lithium-ion battery, a metal can had been used, but a lightweight multi-layered film that has a metal foil layer, has high heat dissipation properties, and can be produced at low cost has come to be used.

A lithium-ion battery including the multi-layered film as the outer package material has a structure in which battery contents are covered with the outer package material including a metal foil layer such as an aluminum foil layer and an SUS foil layer to prevent water from entering inside. Lithium-ion batteries having such a structure are called metal-laminated lithium-ion batteries, and lithium-ion batteries including an aluminum foil layer as the metal foil layer are called aluminum-laminated lithium-ion batteries.

The battery contents of the lithium-ion battery include a positive electrode, a negative electrode, a separator, and an electrolytic solution. In place of the electrolytic solution, an electrolyte layer containing a polymer gel impregnated with the electrolytic solution can be used in some cases. Examples of the electrolytic solution include a solution in which a lithium salt as the electrolyte is dissolved in an aprotic solvent having osmotic properties, such as propylene carbonate, ethylene carbonate, dimethyl carbonate, diethyl carbonate, and ethyl methyl carbonate.

Examples of the aluminum-laminated lithium-ion battery include an embossed lithium-ion battery that is prepared by the following method: a concave portion is formed in a part of an outer package material by cold molding; next, battery contents are stored in the concave portion; then, the residual portion of the outer package material is folded; and the edge portion is sealed by heat sealing. The outer package material included in such a lithium-ion battery is required to exhibit stable sealing performance by the heat sealing and to be unlikely to cause a reduction in laminate strength between an aluminum foil layer and a sealant layer by the electrolytic solution as a battery content (hereinafter, such a property is also referred to as "anti-electrolytic solution property").

For example, Patent Document 1 discloses a laminate in which a base material layer, an aluminum foil layer, and a sealant layer are sequentially stacked. The laminate includes, between the aluminum foil layer and the sealant layer, a resin film layer (adhesive layer) formed from a resin having a hydroxy group and a carboxy group in the molecule.

Patent Document 2 discloses an outer package material including a heat sealing layer (sealant layer) that includes an adhesive polymethylpentene layer.

Patent Document 3 discloses an outer package material including an adhesive layer between an aluminum foil layer and a sealant layer. The adhesive layer has a cross-linked structure in which a polyolefin resin or an acid-modified polyolefin resin is cross-linked through a structure derived from a compound having a (meta)acryloxy group or an allyl group.

In the present description and the claims, the term "aluminum" includes aluminum and alloys thereof.

CITATION LIST

Patent Literature

PTL 1: JP 2004-66645 A
PTL 2: JP 2002-245983 A
PTL 3: JP 2017-201580 A

SUMMARY OF INVENTION

Technical Problem

As thinner and larger-size electronic devices including smartphones and tablet personal computers have been developed, batteries used in these electronic devices are required to be thinned and to have a larger capacity. For these batteries, a thinner outer package material is required, and a thinner sealant layer is also required as the insulator, from the viewpoint of an increase in battery capacity and a reduction in cost. In such a conventional outer package material as disclosed in Patent Document 2, however, if a thinner sealant layer is used, minute cracks are likely to be generated in the sealant layer, for example, by stress during cold molding, and accordingly, an electrolytic solution enters between an aluminum foil layer and the sealant layer through the cracks, unfortunately.

Hence, there is a demand for an outer package material including the above aluminum-laminated multi-layered film and having excellent moldability but having such an adhesive strength between an aluminum foil layer and a sealant layer that the time-dependent deterioration of the adhesive strength by a battery electrolytic solution is suppressed over a longer time. In other words, an outer package material having a higher anti-electrolytic solution property is required to be developed.

The present invention is therefore intended to provide an outer package material having such a sufficient anti-electrolytic solution property that the time-dependent reduction of the adhesive strength between an aluminum foil layer and a sealant layer by a battery electrolytic solution is suppressed over a long time, a method for producing the outer package material, and a composition for adhesives for giving the outer package material.

Solution to Problem

The inventors of the present invention have conducted studies to solve the above problems and consequently have completed the present invention by using a composition containing particular components as an adhesive between a metal foil layer typified by an aluminum foil and a sealant layer.

The present invention therefore includes the following aspects.

[1] A composition for adhesives, the composition being used to form a second adhesive layer in an outer package material for electricity storage devices, the outer package material having a structure in which at least a base material layer, a first adhesive layer, a metal foil layer, the second adhesive layer, and a sealant layer are stacked in sequence, the composition including an isocyanato group and a (meth) acryloyl group and further including a component 1, a component 3, and a component 4:
(component 1) an acid-modified polyolefin,
(component 3) an active energy ray polymerization initiator, and
(component 4) a solvent.

[2] A composition for adhesives, the composition being used to form a second adhesive layer in an outer package material for electricity storage devices, the outer package material having a structure in which at least a base material layer, a first adhesive layer, a metal foil layer, the second adhesive layer, and a sealant layer are stacked in sequence, the composition including a component 1, a component 2, a component 3, and a component 4:
(component 1) an acid-modified polyolefin,
(component 2) a compound having an isocyanato group and a (meth)acryloyl group in a molecule,
(component 3) an active energy ray polymerization initiator, and
(component 4) a solvent.

[3] The composition for adhesives according to the aspect [2], in which the component 2 is a reaction product by reaction of an isocyanato group of an isocyanurate-modified product of a diisocyanate compound with an alcoholic hydroxy group of a (meth)acryloyl-containing compound having the alcoholic hydroxy group.

[4] The composition for adhesives according to the aspect [2] or [3], in which the total number of isocyanato groups and (meth)acryloyl groups in a molecule of the component 2 is 3 or more.

[5] The composition for adhesives according to any one of the aspects [2] to [4], further including a component 5:
(component 5) a compound having a plurality of isocyanato groups in a molecule, the compound being other than the component 2.

[6] The composition for adhesives according to any one of the aspects [2] to [5], further including a component 6:
(component 6) a compound having a plurality of radically polymerizable functional groups in a molecule, the compound being other than the component 2.

[7] The composition for adhesives according to the aspect [6], in which the radically polymerizable functional group is a (meth)acryloyl group.

[8] The composition for adhesives according to any one of the aspects [1] to [7], in which the component 1 is a maleic anhydride-modified polyolefin.

[9] The composition for adhesives according to any one of the aspects [1] to [8], in which the component 1 is an acid-modified product of a copolymer of propylene and an olefin other than propylene.

[10] The composition for adhesives according to any one of the aspects [1] to [9], in which the component 1 has a melting point of 75° C. or more and 90° C. or less.

[11] The composition for adhesives according to any one of the aspects [1] to [10], further including a component 7:
(component 7) a reaction catalyst for facilitating a reaction of an isocyanato group.

[12] The composition for adhesives according to any one of the aspects [1] to [11], in which the ratio of the total number of isocyanato groups to the total number of (meth) acryloyl groups contained in the composition for adhesives is 3.0 or more and 15.0 or less.

[13] The composition for adhesives according to any one of the aspects [1] to [12], in which the proportion of the amount of the component 1 is 60% by mass or more and 96% by mass or less where the amount calculated by subtracting the total amount of the component 3 and the component 4 from the total amount of the composition for adhesives is 100% by mass, and the proportion of the amount of the component 3 is 0.05% by mass or more and 10% by mass or less where the amount calculated by subtracting the amount of the component 4 from the total amount of the composition for adhesives is 100% by mass.

[14] The composition for adhesives according to any one of the aspects [1] to [13], in which the proportion of the amount of the component 1 is 56% by mass or more and 92% by mass or less, the proportion of the amount of the component 3 is 0.05% by mass or more and 10% by mass or less, and the proportion of the amount calculated by subtracting the amount of the component 1, the component 3, and the component 4 from the total amount of the composition for adhesives is 4% by mass or more and 50% by mass or less where the amount calculated by subtracting the amount of the component 4 from the total amount of the composition for adhesives is 100% by mass.

[15] The composition for adhesives according to any one of the aspects [1] to [14], in which the proportion of the amount of the component 4 is 75% by mass or more and 95% by mass or less where the total amount of the composition for adhesives is 100% by mass.

[16] An outer package material for electricity storage devices, the outer package material having a structure in which at least abase material layer, a first adhesive layer, a metal foil layer, a second adhesive layer, and a sealant layer are stacked in sequence,
the second adhesive layer including a polymer of the composition for adhesives according to anyone of the aspects [1] to [15].

[17] The outer package material for electricity storage devices according to the aspect[16], in which a corrosion prevention treatment layer is provided on at least a face of the metal foil layer proximate to the sealant layer, and the sealant layer includes a polyolefin resin.

[18] A method for producing an outer package material for electricity storage devices, the outer package material having a structure in which at least a base material layer, a first adhesive layer, a metal foil layer, a second adhesive layer, and a sealant layer are stacked in sequence, the method including
applying the composition for adhesives according to any one of the aspects [1] to [15] onto one or both of a face of the metal foil layer proximate to the sealant layer and a face of the sealant layer proximate to the metal foil layer; partially or completely removing the solvent from the applied composition for adhesives; and then polymerizing the composition for adhesives from which the solvent has been partially or completely removed, by irradiation with an active energy ray, to form a polymer layer as the second adhesive layer.

[19] A method for producing an outer package material for electricity storage devices, the outer package material having a structure in which at least a base material layer, a first adhesive layer, a metal foil layer, a second adhesive layer, and a sealant layer are stacked in sequence, a corrosion prevention treatment layer being provided on at least a face of the metal foil layer proximate to the sealant layer, the sealant layer including a polyolefin resin, the method including applying the composition for adhesives according to any one of the aspects [1] to [15] onto one or both of a face of the metal foil layer proximate to the sealant layer and a face of the sealant layer proximate to the metal foil layer; partially or completely removing the solvent from the applied composition for adhesives; then polymerizing the composition for adhesives from which the solvent has been partially or completely removed, by irradiation with an active energy ray, to form a polymer layer as the second adhesive layer; and then exposing the polymer layer to an atmosphere at 30° C. or more and 70° C. or less for 1 hour or more.

In the present description, a "(meth)acryloyl group" means one or both of an acryloyl group and a methacryloyl group.

Advantageous Effects of Invention

Use of the composition for adhesives of the present invention as an adhesive between a metal foil layer typified by an aluminum foil and a sealant layer prevents a battery electrolytic solution from causing a time-dependent reduction of the adhesive strength between the metal foil layer and the sealant layer over a long time, and accordingly a stable outer package material for electricity storage devices having a sufficient anti-electrolytic solution property and having a long service life can be produced.

BRIEF DESCRIPTION OF DRAWINGS

FIG. 1 is a cross-sectional view illustrating an embodiment an outer package material for electricity storage devices of the present invention.

DESCRIPTION OF EMBODIMENTS

First, an outer package material for electricity storage devices of the present invention will be described.

An embodiment of the outer package material for electricity storage devices pertaining to the invention is illustrated in FIG. 1. The outer package material is suitably used especially as an outer package material for nonaqueous electrolyte lithium-ion batteries. The outer package material (1) for batteries has a structure in which a unstretched thermoplastic resin film layer (sealant layer) (3) is stacked and integrated through a second adhesive layer (6) on one face (bottom face) of an aluminum foil layer (4) as a metal foil layer, and a stretched heat-resistant resin film layer (base material layer) (2) is stacked and integrated through a first adhesive layer (5) on the other face (top face) of the aluminum foil layer (4).

The stretched heat-resistant resin film layer (base material layer) (2) is a member mainly having a role in providing good moldability as an outer package material, that is, a role in preventing an aluminum foil from breaking by necking during molding. The stretched heat-resistant resin film layer (base material layer) (2) is not specifically limited, and a stretched film made from polyamide or polyester is preferably used. The thickness of the base material layer (2) is preferably set at 12 to 50 μm.

The unstretched thermoplastic resin film layer (sealant layer) (3) has a role in providing excellent chemical resistance against a highly corrosive electrolytic solution or the like used in lithium-ion batteries or the like and a role in imparting heat-sealing property to the outer package material.

The sealant layer (3) is not specifically limited and preferably includes a layer mainly containing a polyolefin resin. Specifically, the sealant layer preferably includes a layer formed from at least one thermoplastic resin selected from the group consisting of a polyethylene (co)polymer, a polypropylene (co)polymer, an acid-modified product thereof, and an ionomer. More preferably, the sealant layer is a layer of an unstretched film formed from at least one thermoplastic resin selected from the group consisting of a polyethylene (co)polymer, a polypropylene (co)polymer, an acid-modified product thereof, and an ionomer, and the thermoplastic resin is particularly preferably a polypropylene (co)polymer.

In the present description, a (co)polymer means one or both of a homopolymer and a copolymer.

The thickness of the sealant layer (3) is preferably set at 20 to 150 μm. By setting the thickness at 20 μm or more, pinholes can be sufficiently prevented from forming, and by setting the thickness at 150 μm or less, the resin used amount can be reduced to reduce the cost. Specifically, the thickness of the unstretched thermoplastic resin film layer (3) is particularly preferably set at 30 to 100 μm.

Each of the base material layer (2) and the sealant layer (3) may be a single layer or a multilayer.

The aluminum foil layer (4) has a role in imparting gas barrier properties to prevent oxygen or water from entering the outer package material. As the aluminum foil layer (4), a foil made from pure aluminum or an aluminum-iron alloy and having a thickness of 5 to 50 μm is preferably used.

The first adhesive layer (5) may be any adhesive layer that can provide a sufficient adhesive strength between the base material layer (2) and the aluminum foil layer (4). Examples of the first adhesive layer include a urethane adhesive layer and an acrylic adhesive layer.

The second adhesive layer (6) includes a polymer of a component that is prepared by partially or completely removing a solvent from a composition for adhesives containing an isocyanato group and a (meth)acryloyl group and further containing a component 1, a component 3, and a component 4:

(component 1) an acid-modified polyolefin;
(component 3) an active energy ray polymerization initiator; and
(component 4) a solvent.

The second adhesive layer (6) is typically formed by applying the above composition for adhesives on one or both of a face of the aluminum foil layer (4) proximate to the sealant layer and a face of the sealant layer (3) proximate to the metal foil layer and by drying the composition. The amount of the second adhesive layer (6) formed in a unit area (solid content application amount) is preferably 1.5 to 5 g/m².

The embodiment employs a structure in which the first adhesive layer (5) is provided in addition to the second adhesive layer (6). The first adhesive layer (5) is not specifically limited, and examples include a urethane adhesive layer and an acrylic adhesive layer.

The outer package material for electricity storage devices of the present invention has a structure in which at least the base material layer, the first adhesive layer, the metal foil layer, the second adhesive layer, and the sealant layer are stacked in sequence, and on at least the face of the metal foil layer proximate to the sealant layer, a corrosion prevention treatment layer is preferably provided. This is because, when an aluminum foil is used as the metal foil, the aluminum surface is prevented from dissolving or corroding by hydrofluoric acid generated by a reaction between an electrolytic solution and water.

The method of forming such a corrosion prevention treatment layer is a method of forming an acid resistance modifying film on an aluminum surface.

Examples of the acid resistance modifying film on an aluminum surface include a phosphate film and a chromic acid film. Examples of the phosphate include zinc phosphate, iron phosphate, manganese phosphate, calcium phosphate, and chromium phosphate, and examples of the chromic acid include chromium chromate.

A composition for adhesives of the present invention will next be described. The composition for adhesives of the present invention is described as below.

In other words, the composition for adhesives is a composition that is used to form a second adhesive layer in an outer package material for electricity storage devices, the outer package material has a structure in which at least a base material layer, a first adhesive layer, a metal foil layer, the second adhesive layer, and a sealant layer are stacked in sequence, and the composition contains an isocyanato group and a (meth)acryloyl group and further contains a component 1, a component 3, and a component 4: (component 1) an acid-modified polyolefin;
(component 3) an active energy ray polymerization initiator; and
(component 4) a solvent.

Examples of the composition for adhesives containing an isocyanato group and a (meth)acryloyl group include an embodiment 1 in which the composition for adhesives contains a compound (component 2) having an isocyanato group and a (meth)acryloyl group in a molecule and an embodiment 2 in which the composition for adhesives contains a compound (component 5) that has a plurality of isocyanato groups in a molecule and is other than the component 2, and contains a compound (component 6-1) that has a plurality of (meth)acryloyl groups in a molecule and is other than the component 2. A combination of the embodiment 1 and the embodiment 2, that is, an embodiment in which the component 2, the component 5, and the component 6-1 are contained may also be used.

The above embodiment 1 of the composition for adhesives of the present invention is as described below.

In other words, a composition for adhesives in the embodiment is used to forma second adhesive layer in an outer package material for electricity storage devices, the outer package material has a structure in which at least a base material layer, a first adhesive layer, a metal foil layer, the second adhesive layer, and a sealant layer are stacked in sequence, and the composition contains a component 1, a component 2, a component 3, and a component 4:
(component 1) an acid-modified polyolefin;
(component 2) a compound having an isocyanato group and a (meth)acryloyl group in a molecule;
(component 3) an active energy ray polymerization initiator; and
(component 4) a solvent.

The embodiment 2 of the composition for adhesives of the present invention is as described below.

In other words, a composition for adhesives in the embodiment is used to forma second adhesive layer in an outer package material for electricity storage devices, the outer package material has a structure in which at least a base material layer, a first adhesive layer, a metal foil layer, the second adhesive layer, and a sealant layer are stacked in sequence, and the composition contains a component 1, a component 5, a component 6-1, a component 3, and a component 4:
(component 1) an acid-modified polyolefin;
(component 5) a compound that has a plurality of isocyanato groups in a molecule and is other than the component 2;
(component 6-1) a compound that has a plurality of (meth)acryloyl groups in a molecule and is other than the component 2;
(component 3) an active energy ray polymerization initiator; and
(component 4) a solvent.

First, the acid-modified polyolefin (component 1) as a component in the composition for adhesives of the present invention will be described.

As the acid-modified polyolefin, for example, a modified polyolefin resin prepared by graft polymerization of a polyolefin with an ethylenically unsaturated carboxylic acid or an acid anhydride thereof or a copolymer resin of an olefin monomer and an ethylenically unsaturated carboxylic acid can be used. Examples of the olefin component of the acid-modified polyolefin include a homopolymer of an olefin monomer such as ethylene, propylene, and butene and a copolymer of such olefin monomers. As the acid component of the acid-modified polyolefin, for example, acrylic acid, methacrylic acid, crotonic acid, maleic acid, maleic anhydride, fumaric acid, fumaric anhydride, itaconic acid, or itaconic anhydride can be used. These ethylenically unsaturated carboxylic acids may be used singly or in combination of two or more of them.

Specifically, the polyolefin component of the acid-modified polyolefin is preferably a copolymer of propylene and an olefin other than propylene and more preferably a copolymer of propylene and a butene-containing olefin. In the case of a copolymer of propylene and butene, the copolymerization ratio, propylene:butene, is preferably 90:10 to 70:30 (molar ratio), more preferably 87:13 to 72:28, and particularly preferably 82:18 to 75:25.

As the acid-modified polyolefin, a modified polyolefin resin prepared by graft polymerization of a polyolefin with an ethylenically unsaturated carboxylic acid or an acid anhydride thereof is preferably used, and the ethylenically unsaturated carboxylic acid or the acid anhydride is more preferably maleic anhydride. When a modified polyolefin resin prepared by addition of maleic anhydride to a polyolefin is used as the acid-modified polyolefin, the addition proportion of maleic anhydride to the total amount of the acid-modified polyolefin is preferably 0.6 to 3.0% by mass, more preferably 0.7 to 2.5% by mass, and particularly preferably 0.8 to 2.0% by mass.

The acid-modified polyolefin preferably has a melting point of 70° C. to 110° C., more preferably 70° C. to 100° C., and particularly preferably 75° C. to 95° C. In the description, the melting point is determined by differential scanning calorimetry in conditions described in the examples later at a temperature increase rate of 10° C./min.

The acid-modified polyolefin used in the present invention preferably has a melting heat quantity of 5 J/g to 60 J/g. The melting heat quantity is more preferably 10 J/g to 50 J/g and most preferably 15 J/g to 40 J/g. When an acid-modified polyolefin having a melting heat quantity of 5 J/g to 60 J/g is used, cohesive power derived from crystals can be maintained, adhesiveness or heat resistance can be kept, dissolution stability in a solvent described later and flowability can be maintained, and operability when the composition for adhesives is handled can be kept. In the description, the melting heat quantity is measured in similar conditions to the above melting point measurement and is determined from an area surrounded by the extended line of the base line and a melting peak.

The acid-modified polyolefin preferably has a weight average molecular weight (Mw) of 60,000 to 150,000, more preferably 70,000 to 140,000, and particularly preferably 80,000 to 130,000. The acid-modified polyolefin preferably has a number average molecular weight (Mn) of 30,000 to 90,000, more preferably 35,000 to 80,000, and particularly preferably 40,000 to 70,000. In the description, the weight average molecular weight (Mw) and the number average molecular weight (Mn) are a weight average molecular weight and a number average molecular weight determined by gel permeation chromatography in terms of polystyrene.

Next, the compound having an isocyanato group and a (meth)acryloyl group in a molecule (component 2) as a component in the composition for adhesives of the present invention will be described.

The compound having an isocyanato group and a (meth)acryloyl group in a molecule may be any compound having both an isocyanato group and a (meth)acryloyl group in a molecule, and examples include a reaction product by reaction of some isocyanato groups of an isocyanurate-modified product of a diisocyanate compound such as tolylene diisocyanate, diphenylmethane diisocyanate, hexamethylene diisocyanate, isophorone diisocyanate, 1,3-bis(isocyanatomethyl)cyclohexane, and 1,4-bis(isocyanatomethyl)cyclohexane, with an alcoholic hydroxy group of a (meth)acryloyl-containing compound having an alcoholic hydroxy group, such as an alcoholic hydroxy group-containing (meth)acrylate compound and an alcoholic hydroxy group-containing (meth)acrylamide compound, a reaction product by reaction of some isocyanato groups of a burette-modified product of a diisocyanate compound such as tolylene diisocyanate, diphenylmethane diisocyanate, hexamethylene diisocyanate, isophorone diisocyanate, 1,3-bis(isocyanatomethyl)cyclohexane, and 1,4-bis(isocyanatomethyl)cyclohexane, with an alcoholic hydroxy group of a (meth)acryloyl-containing compound having an alcoholic hydroxy group, such as an alcoholic hydroxy group-containing (meth)acrylate compound and an alcoholic hydroxy group-containing (meth)acrylamide compound, a reaction product by reaction of some isocyanato groups of a modified product by addition of a polyhydric alcohol such as trimethylolpropane to the above diisocyanate compound, with an alcoholic hydroxy group of a (meth)acryloyl-containing compound having an alcoholic hydroxy group, such as an alcoholic hydroxy group-containing (meth)acrylate compound and an alcoholic hydroxy group-containing (meth)acrylamide compound, an oligomer having an acryloyl group and an isocyanato group and represented by Formula (1), and a compound having an acryloyl group and an isocyanato group and represented by Formula (2).

Formula (1):

[Chemical Formula 1]

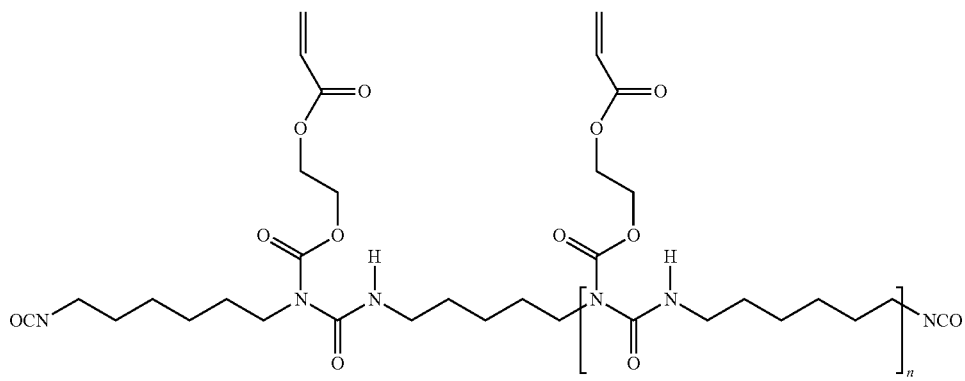

(In Formula (1), n is an integer of 1 or more; and the upper limit of n is typically 16)

Formula (2):

[Chemical Formula 2]

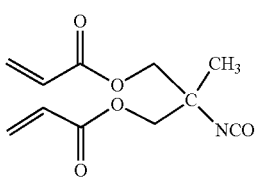

Examples of the commercial product of the oligomer having an acryloyl group and an isocyanato group and represented by Formula (1) include Laromer (registered trademark) PR9000 manufactured by BASF, and examples of the commercial product of the compound having an acryloyl group and an isocyanato group and represented by Formula (2) include Karenz (registered trademark) BEI manufactured by Showa Denko K.K. The compounds having an isocyanato group and a (meth)acryloyl group may be used singly or in combination of two or more of them.

As the compound having an isocyanato group and a (meth)acryloyl group in a molecule and used in the present invention, a compound having a total number of isocyanato groups and (meth)acryloyl groups in a molecule of 3 or more is preferred.

For example, in terms of structure, preferred are a reaction product by reaction of some isocyanato groups of an isocyanurate-modified product of a diisocyanate compound such as tolylene diisocyanate, diphenylmethane diisocyanate, hexamethylene diisocyanate, isophorone diisocyanate, 1,3-bis(isocyanatomethyl)cyclohexane, and 1,4-bis(isocyanatomethyl)cyclohexane, with an alcoholic hydroxy group of a (meth)acryloyl-containing compound having an alcoholic hydroxy group, such as an alcoholic hydroxy group-containing (meth)acrylate compound and an alcoholic hydroxy group-containing (meth)acrylamide compound and an oligomer having an acryloyl group and an isocyanato group and represented by Formula (1).

A reaction product by reaction of some isocyanato groups of an isocyanurate-modified product of a diisocyanate compound such as hexamethylene diisocyanate, isophorone diisocyanate, 1,3-bis(isocyanatomethyl)cyclohexane, and 1,4-bis(isocyanatomethyl)cyclohexane, with an alcoholic hydroxy group of an alcoholic hydroxy group-containing (meth)acrylate compound and an oligomer having an acryloyl group and an isocyanato group and represented by Formula (1) are more preferred, and a reaction product by reaction of some isocyanato groups of an isocyanurate-modified product of a diisocyanate compound such as hexamethylene diisocyanate, 1,3-bis(isocyanatomethyl)cyclohexane, and 1,4-bis(isocyanatomethyl)cyclohexane, with an alcoholic hydroxy group of an alcoholic hydroxy group-containing (meth)acrylate compound and an oligomer having an acryloyl group and an isocyanato group and represented by Formula (1) are particularly preferred.

The isocyanato group of the compound having an isocyanato group and a (meth)acryloyl group in a molecule is to be reacted with an acid-modified polyolefin to function as a curing agent for curing the composition for adhesives. The (meth)acryloyl group of the compound having an isocyanato group and a (meth)acryloyl group in a molecule is to undergo radical polymerization reaction to polymerize or cure the composition for adhesives.

In the description, "(meth)acrylate" means one or both of acrylate and methacrylate. In the description, "(meth)acrylamide" means one or both of acrylamide and methacrylamide.

In all the compounds in the composition for adhesives of the present invention, the ratio of the total number of isocyanato groups (—NCO groups) to the total number of carboxy groups (—COOH groups) [NCO]/[COOH]) is preferably set at 1.0 to 20.0. When the ratio is set at such a range, the composition for adhesives can have excellent initial adhesiveness. In addition, the time-dependent reduction of the adhesive strength between the aluminum foil layer (4) and the sealant layer (3) by a battery electrolytic solution can be sufficiently suppressed for a long time, and the anti-electrolytic solution property can be improved. The above ratio ([NCO]/[COOH]) is more preferably set at 2.0 to 15.0 and specifically preferably to 3.0 to 12.0.

In the present description, one carboxylic anhydride that is a dehydrocondensation product of two carboxy groups and is represented by —C(=O)—O—C(=O)— is to have two carboxy groups.

In the composition for adhesives of the present invention, the proportion of the amount of the component 1 is 60% by mass to 96% by mass and is preferably 70% by mass to 95% by mass where the amount calculated by subtracting the amount of the component 3 and the component 4 from the total amount of the composition for adhesives is 100% by mass.

Similarly, the proportion of the amount of the component 2 in the embodiment 1 or the proportion of the total amount of the component 5 and the component 6-1 in the embodiment 2 can be more than 0% by mass and not more than 40% by mass and is preferably not less than 0.1% by mass and less than 30% by mass.

Similarly, the proportion of the amount calculated by subtracting the amount of the component 1, the component 3, and the component 4 from the total amount of the composition for adhesives can be 4% by mass to 40% by mass, is preferably 5% by mass to 30% by mass, and is particularly preferably 10% by mass to 25% by mass.

When the proportion of the amount of the component 1 is 60% by mass to 96% by mass, and the proportion of the amount calculated by subtracting the amount of the component 1, the component 3, and the component 4 from the total amount of the composition for adhesives is 4% by mass to 40% by mass where the amount calculated by subtracting the amount of the component 3 and the component 4 from the total amount of the composition for adhesives is 100% by mass, the time-dependent reduction of the adhesive strength between the metal foil layer typified by an aluminum foil and the sealant layer can be suppressed for a long time, and the anti-electrolytic solution property can be sufficiently achieved.

Next, the active energy ray polymerization initiator (component 3) as a component in the composition for adhesives of the present invention will be described. The active energy ray polymerization initiator may be any radical polymerization initiator sensitive to active energy rays. The active energy rays include electromagnetic waves and particle rays, such as near infrared light, visible light, ultraviolet light, vacuum ultraviolet light, X-rays, γ-rays, and electron beams. Typically, a photoinitiator sensitive to irradiation of visible light or ultraviolet light is preferably used.

Specific examples of the photoinitiator include acetophenone, 2,2-dimethoxy-2-phenylacetophenone, diethoxyacetophenone, 1-hydroxycyclohexyl phenyl ketone, 2-hydroxy-2-methylpropiophenone, α-hydroxycyclohexyl phenyl ketone, 2-hydroxy-1-(4-isopropenylphenyl)-2-methylpropan-1-one, 2-hydroxy-2-methyl-1-(4-isopropylphenyl)propanone, 2-hydroxy-2-methyl-1-(4-dodecylphenyl)propanone, 2-hydroxy-2-methyl-1-[(2-hydroxyethoxy)phenyl]propanone, benzophenone, 2-methylbenzophenone, 3-methylbenzophenone, 4-methylbenzophenone, 4-methoxybenzophenone, 2-chlorobenzophenone, 4-chlorobenzophenone, 4-bromobenzophenone, 2-carboxybenzophenone, 2-ethoxycarbonylbenzophenone, 4-benzoyl-4'-methyldiphenyl sulfide, benzophenonetetracarboxylic acid or a tetramethyl ester thereof, 4,4'-bis(dialkylamino)benzophenones (for example, 4,4'-bis(dimethylamino)benzophenone, 4,4'-bis(dicyclohexylamino)benzophenone, 4,4'-bis(diethylamino)benzophenone, 4,4'-bis(dihydroxyethylamino)benzophenone), 4-methoxy-4'-dimethylaminobenzophenone, 4,4'-dimethoxybenzophenone, 4-dimethylaminobenzophenone, 4-dimethylaminoacetophenone, benzil, anthraquinone, 2-t-butylanthraquinone, 2-methylanthraquinone, phenanthraquinone, fluorenone, 2-(dimethylamino)-2-[(4-methylphenyl)methyl]-1-[4-(4-morpholinyl)phenyl]butanone-1, 2-benzyl-2-methylamino-1-(4-morpholinophenyl)butanone-1, 2-methyl-1-[4-(methylthio)phenyl]-2-morpholinopropan-1-on e, 2-hydroxy-1-(4-isopropenylphenyl)-2-methylpropan-1-one and an oligomer thereof, benzoin, benzoin ethers (for example, benzoin methyl ether, benzoin ethyl ether, benzoin propyl ether, benzoin isopropyl ether, benzoin isobutyl ether, benzoin phenyl ether, and benzyl dimethyl ketal), acridone, chloroacridone, N-methylacridone, N-butylacridone, n-butyl-chloroacridone, and acylphosphine oxide compounds such as 2,4,6-trimethylbenzoyldiphenylphosphine oxide, 2,6-dimethoxybenzoyldiphenylphosphine oxide, 2,6-dichlorobenzoyldiphenylphosphine oxide, 2,4,6-trimethylbenzoylmethoxyphenylphosphine oxide, 2,4,6-trimethylbenzoylethoxyphenylphosphine oxide, 2,3,5,6-tetramethylbenzoyldiphenylphosphine oxide, and 2,4,6-trimethoxybenzoyldiphenylphosphine oxide. Examples of the acylphosphonate compound include benzoyldi-(2,6-dimethylphenyl)phosphonate. Examples of the bisacylphosphine oxide compound include bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-propylphenylphosphine oxide, bis-(2,6-dichlorobenzoyl)-1-naphthylphosphine oxide, bis-(2,6-dimethoxybenzoyl)phenylphosphine oxide, bis-(2,6-dimethoxybenzoyl)-2,4,4-trimethylpentylphosphine oxide, bis-(2,6-dimethoxybenzoyl)-2,5-dimethylphenylphosphine oxide, bis-(2,4,6-trimethylbenzoyl)phenylphosphine oxide, (2,5,6-trimethylbenzoyl)-2,4,4-trimethylpentylphosphine oxide, 2-isopropylthioxanthone, 4-isopropylthioxanthone, 2,4-diethylthioxanthone, 2,4-chlorothioxanthone, and 1-chloro-4-propoxythioxanthone.

In addition to the hydrogen abstraction type photoinitiator (for example, benzophenone photoinitiators and thioxanthone photoinitiators), a compound having an excellent promoting function and generally called photopolymerization accelerator (for example, isoamyl p-dimethylaminobenzoate and ethyl p-dimethylaminobenzoate) is also defined to be included in the photoinitiator in the present invention.

As the photoinitiator, a metallocene compound can also be used. As the metallocene compound, a compound containing, as the central metal, a transition element typified by Fe, Ti, V, Cr, Mn, Co, Ni, Mo, Ru, Rh, Lu, Ta, W, Os, and Ir can be used, and examples include bis(η5-2,4-cyclopentadien-1-yl)-bis[2,6-difluoro-3-(pyrrol-1-yl)phenyl]titanium.

These photoinitiators can be used singly or in combination of two or more of them.

Of these photoinitiators, acylphosphine oxide compounds, bisacylphosphine oxide compounds, 2-methyl-1-[4-(methylthio)phenyl]-2-morpholinopropan-1-on e, 2-benzyl-2-methylamino-1-(4-morpholinophenyl)butanone-1, 2,2-dimethoxy-1,2-diphenylethan-1-one, and 1-hydroxycyclohexyl phenyl ketone are preferred, and 2,4,6-trimethylbenzoyldiphenylphosphine oxide, 2,4,6-trimethoxybenzoyldiphenylphosphine oxide, 1-hydroxycyclohexyl phenyl ketone, 2-hydroxy-2-methylpropiophenone, 2-hydroxy-1-(4-isopropenylphenyl)-2-methylpropan-1-one and an oligomer thereof, and 2,4,6-trimethylbenzophenone are more preferred. Specifically preferred examples of the photoinitiator include diphenyl-2,4,6-trimethylbenzoylphosphine oxide, 2-hydroxy-2-methylpropiophenone, 2-hydroxy-1-(4-isopropenylphenyl)-2-methylpropan-1-one and an oligomer thereof, and 2,4,6-trimethylbenzophenone. A mixture thereof, product name "ESACURE KTO 46" manufactured by LAMBERTI S.p.A, can be used.

The amount of the active energy ray polymerization initiator as the component 3 is preferably 0.05 to 10% by mass and more preferably 0.1 to 8% by mass where the amount calculated by subtracting the amount of the component 4 described later from the total amount of the composition for adhesives is 100% by mass.

When the active energy ray polymerization initiator is used in an amount of 0.05 to 10% by mass, radically polymerizable components including the component 2 are polymerized upon irradiation of active energy rays, and physical properties of the resulting polymer are unlikely to be adversely affected.

The proportion of the amount of the component 1 is preferably 56 to 92% by mass, and the proportion of the amount of the component 3 is preferably 0.05 to 10% by mass, where the amount calculated by subtracting the amount of the component 4 from the total amount of the composition for adhesives of the present invention is 100% by mass.

When the proportion of the amount of the component 1 is 56 to 92% by mass, and the proportion of the amount of the component 3 is 0.05 to 10% by mass, where the amount calculated by subtracting the amount of the component 4 from the total amount of the composition for adhesives of the present invention is 100% by mass, the time-dependent reduction of the adhesive strength between the metal foil layer typified by an aluminum foil and the sealant layer can be suppressed for a long time, and the anti-electrolytic solution property can be sufficiently achieved.

Next, the solvent (component 4) as a component in the composition for adhesives of the present invention will be described.

The solvent used in the composition for adhesives of the present invention may be any solvent that can dissolve or disperse the acid-modified polyolefin. Specifically, an organic solvent capable of dissolving the acid-modified polyolefin is preferably used. As the organic solvent, an organic solvent that can be easily volatilized and removed from the composition for adhesives of the present invention, for example, by heating the organic solvent is preferably used.

Examples of the organic solvent that can dissolve the acid-modified polyolefin and can be easily volatilized and removed, for example, by heating include aromatic organic solvents such as toluene and xylene, aliphatic organic solvents such as n-hexane, alicyclic organic solvents such as cyclohexane and methylcyclohexane (MCH), and ketone organic solvents such as methyl ethyl ketone (MEK). These organic solvents may be used singly or in combination of two or more of them.

In combination with the above organic solvent that can dissolve the acid-modified polyolefin and can be easily volatilized and removed, for example, by heating, an additional organic solvent can be used. As such an additional organic solvent, an acetate organic solvent such as ethyl acetate and n-propyl acetate is preferably used.

Relative to the total amount of the composition for adhesives of the present invention, the amount of the solvent is preferably 75 to 95% by mass. When the component 4 is used in such an amount, the composition for adhesives can maintain an appropriate viscosity and can give an appropriate adhesive thickness when the composition is applied, and the solvent is removed.

The composition for adhesives preferably has a viscosity of 200 mPa·s or less at the time of coating at 25° C.

The composition for adhesives of the present invention can contain and preferably contains a compound (component 5) that has a plurality of isocyanato groups in a molecule and is other than the component 2, as needed.

Examples of the compound as the component 5 include an isocyanurate-modified product of a diisocyanate compound such as tolylene diisocyanate, diphenylmethane diisocyanate, hexamethylene diisocyanate, isophorone diisocyanate, 1,3-bis(isocyanatomethyl)cyclohexane, and 1,4-bis(isocyanatomethyl)cyclohexane, a burette-modified product of a diisocyanate compound such as tolylene diisocyanate, diphenylmethane diisocyanate, hexamethylene diisocyanate, isophorone diisocyanate, 1,3-bis(isocyanatomethyl)cyclohexane, and 1,4-bis(isocyanatomethyl)cyclohexane, a modified product by addition of a polyhydric alcohol such as trimethylolpropane to a diisocyanate compound such as tolylene diisocyanate, diphenylmethane diisocyanate, hexamethylene diisocyanate, isophorone diisocyanate, 1,3-bis(isocyanatomethyl)cyclohexane, and 1,4-bis(isocyanatomethyl)cyclohexane, and a polymeric MDI represented by Formula (3).

Formula (3):

[Chemical Formula 3]

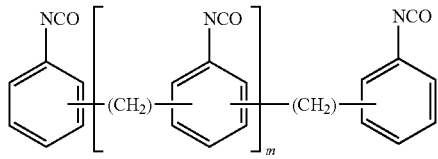

(m is an integer of 0 or more and 50 or less; and the average of m's is more than 0)

The compounds as the component 5 may be used singly or in combination of two or more of them. The compound as the component 5 preferably includes a compound having three or more isocyanato groups in a molecule.

Specifically, the compound preferably includes at least one compound selected from an isocyanurate-modified product of a diisocyanate compound such as tolylene diisocyanate, diphenylmethane diisocyanate, hexamethylene diisocyanate, isophorone diisocyanate, 1,3-bis(isocyanatomethyl)cyclohexane, and 1,4-bis(isocyanatomethyl)cyclohexane, a modified product by addition of a polyhydric alcohol such as trimethylolpropane to a diisocyanate compound such as tolylene diisocyanate, diphenylmethane diisocyanate, hexamethylene diisocyanate, isophorone diisocyanate, 1,3-bis(isocyanatomethyl)cyclohexane, and 1,4-bis(isocyanatomethyl)cyclohexane, and a polymeric MDI represented by Formula (3), more preferably includes at least one compound selected from an isocyanurate-modified product of a diisocyanate compound such as hexamethylene diisocyanate, isophorone diisocyanate, 1,3-bis(isocyanatomethyl)cyclohexane, and 1,4-bis(isocyanatomethyl)cyclohexane and a polymeric MDI represented by Formula (3), and particularly preferably includes at least one compound selected from an isocyanurate-modified product of a diisocyanate compound such as hexamethylene diisocyanate, 1,3-bis(isocyanatomethyl)cyclohexane, and 1,4-bis(isocyanatomethyl)cyclohexane and a polymeric MDI represented by Formula (3).

In terms of reactivity of an isocyanato group of the compound as the component 5, combination use of two or more compounds having isocyanato groups with different reactivities or use of, as the component 5, a compound having a primary isocyanato group of the isocyanato groups is preferred to keep a balance between the reactivity and the usable time of the mixture.

The preferred amount of the component 5 in the composition for adhesives of the present invention varies with the amounts of other components, thus is not strictly defined, and can be more than 0% by mass and less than 30% by mass where the amount calculated by subtracting the amount of the component 3 and the component 4 from the total amount of the composition for adhesives is 100% by mass.

In consideration of the balance between photopolymerization and thermal curing of the composition for adhesives of the present invention, the ratio of the total number of isocyanato groups to the total number of acryloyl groups and methacryloyl groups in the composition for adhesives of the present invention, that is, to the total number of (meth)acryloyl groups is preferably 3.0 to 15.0, more preferably 3.5 to 14.5, and particularly preferably 4.0 to 14.0.

When the ratio of the total number of isocyanato groups to the total number of (meth)acryloyl groups in the composition for adhesives of the present invention is 3.0 to 15.0, a photopolymerized adhesive is unlikely to be excessively hardened and to interfere with subsequent thermal curing reaction, and an outer package material for electricity storage devices after thermal curing has good anti-electrolytic solution property. Hence, such a condition is preferred.

The composition for adhesives of the present invention can contain a compound (component 6) that has a plurality of radically polymerizable functional groups in a molecule and is other than the component 2, as needed. Examples of the radically polymerizable functional group include a (meth)acryloyl group, an allyl group, a vinyloxycarbonyl group, and a vinylcarbamoyl group.

The compound as the component 6 is preferably a compound having a plurality of (meth)acryloyl groups in a molecule or a compound having a (meth)acryloyl group and an additional radically polymerizable group such as an allyl group in a molecule. In the description, a compound that has a plurality of (meth)acryloyl groups in a molecule and is other than the component 2 is specifically called (component 6-1).

When the composition for adhesives of the present invention contains a compound having a plurality of (meth)acryloyl groups in a molecule or a compound having a (meth)acryloyl group and an additional radically polymerizable group such as an allyl group in a molecule, the composition for adhesives easily forms a cross-linked structure by irradiation of active energy rays.

Specific examples of the compound as the component 6-1 include a di(meth)acrylate of a dihydric alcohol, such as 1,4-butanediol di(meth)acrylate, 3-methyl-1,5-pentanediol di(meth)acrylate, 1,6-hexanediol di(meth)acrylate, neopentyl glycol di(meth)acrylate, 1,9-nonanediol di(meth)acrylate, 2-methyl-1,8-octanediol di(meth)acrylate, 2-butyl-2-ethyl-1,3-propanediol di(meth)acrylate, tricyclodecanedimethanol di(meth)acrylate, ethylene glycol di(meth)acrylate, diethylene glycol di(meth)acrylate, triethylene glycol di(meth)acrylate, dipropylene glycol di(meth)acrylate, and tripropylene glycol di(meth)acrylate.

Specific examples of the compound as the component 6-1 further include polyethylene glycol di(meth)acrylate, polypropylene glycol di(meth)acrylate, and tris(2-hydroxyethyl) isocyanurate di(meth)acrylate.

Specific examples of the compound as the component 6-1 further include a diol di(meth)acrylate prepared by addition of 4 mol or more of ethylene oxide or propylene oxide to 1 mol of neopentyl glycol and a diol di(meth)acrylate prepared by addition of 2 mol of ethylene oxide or propylene oxide to 1 mol of bisphenol A.

Specific examples of the compound as the component 6-1 further include trimethylolpropane tri(meth)acrylate, ethylene oxide-modified trimethylolpropane tri(meth)acrylate, propylene oxide-modified trimethylolpropane tri(meth)acrylate, ditrimethylolpropane tri(meth)acrylate, ditrimethylolpropane tetra(meth)acrylate, tris(2-(meth)acryloyloxyethyl) isocyanurate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, and dipentaerythritol hexa(meth)acrylate.

Specific examples of the compound as the component 6-1 further include a tri(meth)acrylate compound prepared by reaction of a trimer of diisocyanate with an alcoholic hydroxy group-containing alkyl (meth)acrylate (see Formula (4) to Formula (6)) and a poly(meth)acrylate compound prepared by reaction of all the isocyanato groups of polymethylene polyphenyl polyisocyanate (polymeric MDI) with an alcoholic hydroxy group of an alcoholic hydroxy group-containing alkyl (meth)acrylate (see Formula (7)).

Formula (4):

[Chemical Formula 4]

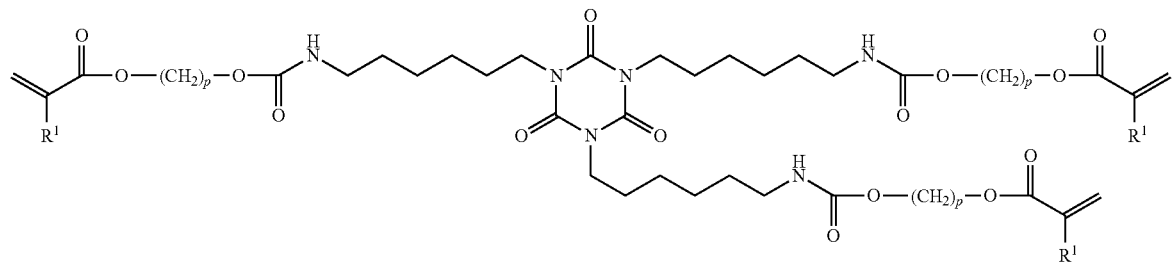

(In Formula (4), three $R^1$'s are independently a hydrogen or a methyl group; and three p's are independently an integer of 2 to 4)

Formula (5):

[Chemical Formula 5]

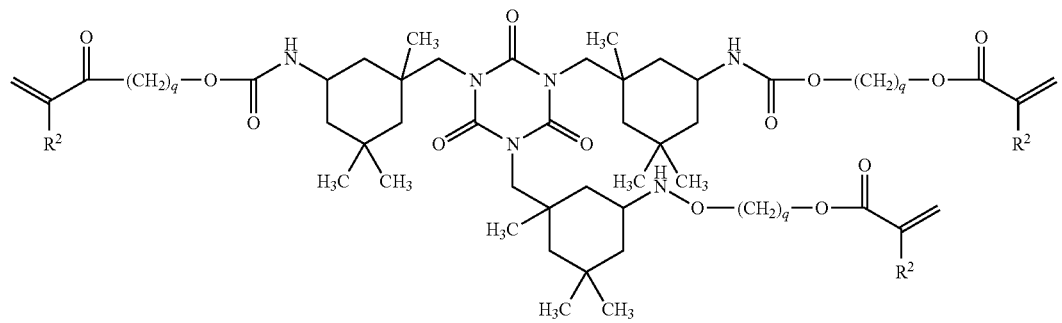

(In Formula (5), three $R^2$'s are independently a hydrogen or a methyl group; and three q's are independently an integer of 2 to 4)

Formula (6):

[Chemical Formula 6]

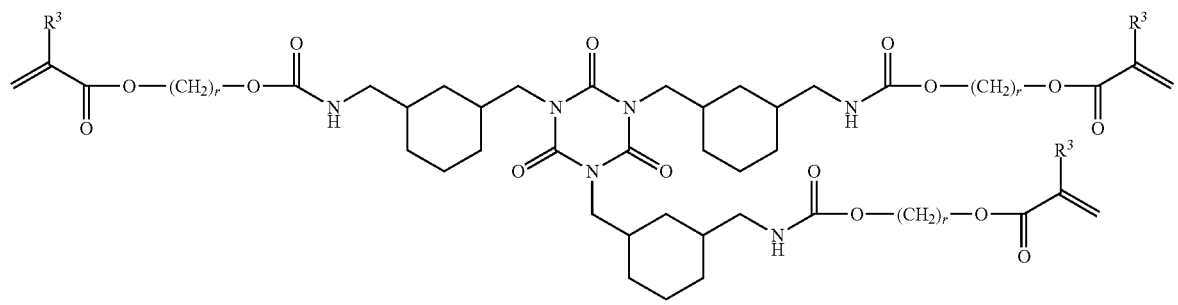

(In Formula (6), three $R^3$'s are independently a hydrogen or a methyl group; and three r's are independently an integer of 2 to 4)

Formula (7):

[Chemical Formula 7]

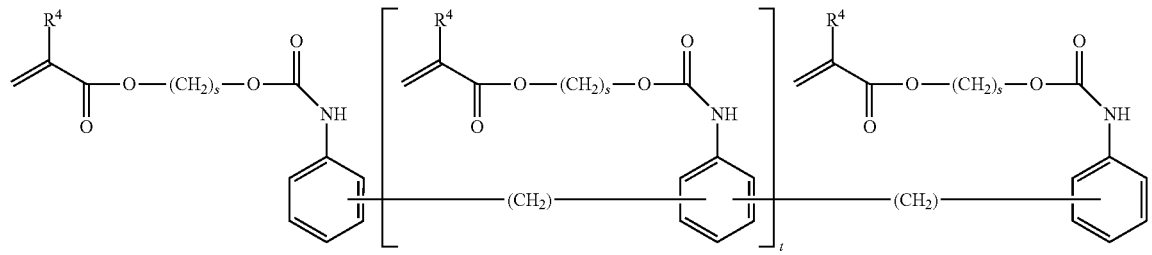

(In Formula (7), (2+t) pieces of $R^4$'s are independently a hydrogen or a methyl group; (2+t) pieces of s's are independently an integer of 2 to 4; and t is an integer of 0 or more)

Examples of the compound that has a (meth)acryloyl group and an additional radically polymerizable group such as an allyl group in a molecule and is other than the component 2 include allyl (meth)acrylate, bis((meth)allyloxyethyl)-mono(acryloyloxyethyl) isocyanurate, and mono(allyloxyethyl)-bis((meth)acryloyloxyethyl) isocyanurate. These compounds having a plurality of (meth)acryloyl groups in a molecule can be used singly or in combination of two or more of them.

Specifically preferred are a compound of Formula (4), a compound of Formula (6), bis((meth)allyloxyethyl)-mono(acryloyloxyethyl) isocyanurate, and mono(allyloxyethyl)-bis((meth)acryloyloxyethyl) isocyanurate.

The composition for adhesives of the present invention can contain and preferably contains a reaction catalyst (component 7) for an isocyanato group. The reaction catalyst for an isocyanato group is for facilitating the reaction between a carboxy group and an isocyanato group, and examples include, but are not necessarily limited to, an organic tin compound and a tertiary amine.

Specific examples of the organic tin compound include dibutyltin dilaurate, dibutyltin dimaleate, dioctyltin dilaurate, and dioctyltin dimaleate.

Specific examples of the tertiary amine include tetraalkylethylenediamines such as tetramethylethylenediamine, N,N'-dialkylbenzylamines such as dimethylbenzylamine, triethylenediamine, pentamethylenediethylenetriamine, N-ethylmorpholine, N-methylmorpholine, 1-methyl-4-dimethylamine ethylpiperazine, and diazabicycloundecene.

These reaction catalysts may be used singly or in combination of two or more of them.

When the reaction catalyst is used, the proportion of the amount of the reaction catalyst is preferably 0.01 to 3 parts by mass where the amount calculated by subtracting the amount of the component 4 from the total amount of the composition for adhesives of the present invention is 100% by mass. When the proportion is within the range, the pot life after mixing is easily balanced with the time until the adhesive strength is exhibited after a metal foil layer is bonded to a sealant layer through a polymer of the composition for adhesives of the present invention.

The composition for adhesives of the present invention may contain a tackifier, a plasticizer, a polyolefin having no acidic functional group, and a thermoplastic resin other than the polyolefin to such an extent that the effect of the invention is not impaired.

Examples of the tackifier include, but are not necessarily limited to, natural tackifiers such as a polyterpene resin and a rosin resin and petroleum tackifiers such as an aliphatic (C5) resin, an aromatic (C9) resin, a copolymer (C5/C9) resin, and an alicyclic resin derived from cracked oil distillates of naphtha. Examples further include a hydrogenated resin prepared by hydrogenation of double bond moieties of such a resin. These tackifiers may be used singly or in combination of two or more of them.

Examples of the polyolefin having no acidic functional group or the thermoplastic resin other than the polyolefin include, but are not necessarily limited to, an ethylene-vinyl acetate copolymer resin, an ethylene-ethyl acrylate copolymer resin, and wax. Examples of the olefinic thermoplastic elastomer having no carboxy group include, but are not necessarily limited to, SEBS (styrene-ethylene-butylene-styrene) and SEPS (styrene-ethylene-propylene-styrene).

A method for producing an outer package material for electricity storage devices of the present invention will next be described.

The method for producing an outer package material for electricity storage devices of the present invention is a method for producing the above outer package material for electricity storage devices. The method for producing an outer package material for electricity storage devices includes applying the above composition for adhesives onto one or both of a face of the metal foil layer proximate to the sealant layer and a face of the sealant layer proximate to the metal foil layer, partially or completely removing the solvent, and then polymerizing the composition for adhesives from which the solvent has been partially or completely removed, by irradiation of active energy rays, to form a polymer layer as the second adhesive layer.

On a face opposite to the face of the metal foil layer proximate to the sealant layer, the base material layer is preferably, previously stacked through the first adhesive layer before application of the second adhesive layer.

On at least the face of the metal foil layer proximate to the sealant layer, a corrosion prevention treatment layer is preferably provided. The sealant layer preferably contains a polyolefin resin.

Examples of the method for applying the composition for adhesives include gravure printing, offset printing, screen printing, and bar coat printing. In consideration of the thickness of the second adhesive layer, the application method is most preferably gravure printing.

The method for partially or completely removing the solvent after application of the composition for adhesives is preferably a method of drying and removing a solvent at a certain temperature not lower than room temperature. The above certain temperature is preferably a temperature lower than the boiling point of a solvent. When a plurality of solvents are mixed as the component 4, the above certain temperature is preferably a temperature lower than the lowest boiling point of the boiling points of the plurality of solvents used as the component 4.

The composition for adhesives from which the solvent has been partially or completely removed is irradiated with active energy rays. As the active energy rays used for the irradiation, electromagnetic waves or particle rays having energy, such as visible light, ultraviolet light, vacuum ultraviolet light, X-rays, γ-rays, and electron beams can be used, and typically, ultraviolet light or visible light is used in many cases. When the active energy rays are ultraviolet light or visible light, any irradiation light source can be used for polymerization or curing, and for example, a low-pressure mercury lamp, a medium-pressure mercury lamp, a high-pressure mercury lamp, an ultra-high-pressure mercury lamp, a xenon lamp, a metal halide lamp, or a halogen lamp can be used. The light irradiation amount for the polymerization varies with compositions and is typically 50 to 2,000 mJ in many cases.

The composition for adhesives from which the solvent has been partially or completely removed is polymerized by irradiation with active energy rays, and a polymer layer can be formed.

The composition for adhesives from which the solvent has been partially or completely removed is polymerized by irradiation with active energy rays, to form a polymer layer, and then the polymer layer is preferably exposed to an atmosphere at 20° C. to 70° C. for 1 hour or more. More preferably, the polymer layer is exposed to an atmosphere at 30° C. to 60° C. for 1 hour or more.

By exposure to an atmosphere at 20° C. to 70° C. for 1 hour or more, the reaction time of an isocyanato group, a carboxy group, and an alcoholic hydroxy group in the composition for adhesives is accelerated. The carboxy group and the alcoholic hydroxy group are present in the composition for adhesives, on the face of the metal foil layer proximate to the sealant layer, and on the face of the sealant layer proximate to the metal foil layer. At a temperature ranging from 20° C. to 70° C., physical properties of the sealant layer are hardly changed.

The time of exposure to an atmosphere at 20° C. to 70° C. is preferably 3 hours or more and more preferably 6 hours or more.

The outer package material for electricity storage devices of the present invention is suitably used as an outer package material for nonaqueous electrolyte lithium-ion batteries, but the application is not limited thereto.

By molding (for example, deep-drawing or stretch forming) the outer package material for electricity storage devices of the present invention, a battery case can be produced.

EXAMPLES

Specific examples of the present invention will next be described, but the present invention is not necessarily limited to these examples.

Production Example 1

Ina three-necked flask equipped with a condenser having a calcium chloride tube at the top, a thermometer, a dropping funnel, and a stirrer having stirring blades, 112.27 parts by mass of TAKENATE (registered trademark) D-127N (an ethyl acetate solution mainly containing an isocyanurate-modified product of 1,3-bis(isocyanatomethyl)cyclohexane at an active component content of 75.5% by mass, NCO concentration: 13.8% by mass, manufactured by Mitsui Chemicals, Inc.) and 0.02 parts by mass of dibutyltin laurate as a tin catalyst were placed. In the dropping funnel, 17.72 parts by mass of 4-hydroxybutyl acrylate was placed for dropwise addition.

Stirring was then started, and the temperature in the three-necked flask was increased to 70° C. by using an oil bath. The stirrer having stirring blades was used to stir the mixture, and from the dropping funnel, 17.72 parts by mass of the 4-hydroxybutyl acrylate was added dropwise over 20 minutes such that the temperature in the three-necked flask was controlled at 70 to 75° C. The reaction was continued for 4 hours. After the peak of 4-hydroxybutyl acrylate was not observed by gas chromatography, the reaction was stopped to give an ethyl acetate solution (a solid content concentration of 78.8% by mass) of an oligomer (hereinafter referred to as "oligomer 1") in which 4-hydroxybutyl acrylate was added to 1/3 of all the isocyanato groups in the isocyanurate-modified product of 1,3-bis(isocyanatomethyl)cyclohexane.

Production Example 2

The same procedure as in Production Example 1 was performed except that the amount of TAKENATE (registered trademark) D-127N in Production Example 1 was changed to 98.81 parts by mass, and the amount of 4-hydroxybutyl acrylate was changed to 31.19 parts by mass, giving an ethyl acetate solution (a solid content concentration of 81.4% by mass) of an oligomer (hereinafter referred to as "oligomer 2") in which 4-hydroxybutyl acrylate was added to 2/3 of all the isocyanato groups in the isocyanurate-modified product of 1,3-bis(isocyanatomethyl)cyclohexane.

Production Example 3

In a three-necked flask equipped with a condenser having a calcium chloride tube at the top, a thermometer, a dropping funnel, and a stirrer having stirring blades, 104.15 parts by mass of Duranate (registered trademark) TKA-100 (an isocyanurate-modified product of hexamethylene diisocyanate, NCO concentration: 21.7% by mass, manufactured by Asahi Kasei Corporation) and 0.02 parts by mass of dibutyltin laurate as a tin catalyst were placed. In the dropping funnel, 25.85 parts by mass of 4-hydroxybutyl acrylate was placed for dropwise addition.

Stirring was then started, and the temperature in the three-necked flask was increased to 70° C. by using an oil bath. The stirrer having stirring blades was used to stir the mixture, and from the dropping funnel, 25.85 parts by mass of the 4-hydroxybutyl acrylate was added dropwise over 20 minutes such that the temperature in the three-necked flask was controlled at 70 to 75° C. The reaction was continued for 4 hours. After the peak of 4-hydroxybutyl acrylate was not observed by gas chromatography, the reaction was stopped to give an oligomer (hereinafter referred to as "oligomer 3") in which 4-hydroxybutyl acrylate was added to 1/3 of all the isocyanato groups in the isocyanurate-modified product of hexamethylene diisocyanate.

Production Example 4

The same procedure as in Production Example 3 was performed except that the amount of Duranate (registered trademark) TKA-100 was changed to 86.88 parts by mass, and the amount of 4-hydroxybutyl acrylate was changed to 43.12 parts by mass, giving an oligomer (hereinafter referred to as "oligomer 4") in which 4-hydroxybutyl acrylate was added to ⅔ of all the isocyanato groups in the isocyanurate-modified product of hexamethylene diisocyanate.

Examples 1 to 7, Comparative Example 1

In a 500-mL flask equipped with a condenser and a stirrer, the component 1 and the component 4 listed in Table 1 were placed, and the mixture was stirred at 60° C. for 10 minutes to give a liquid resin composition. The resin composition was then cooled to room temperature.

Next, the component 2 or the component 6-1, the component 3, a reaction catalyst for an isocyanato group, and as needed, the component 5 were mixed at a ratio listed in Table 1, to give a composition for adhesives.

To prepare the test piece described later, the composition for adhesives was used within 2 hours after mixing the component 2, the component 6-1, or the component 5.

The obtained compositions for adhesives listed in Table 1 were used to perform the evaluations described later. These results are listed in Table 1. In Table 1, the unit of each value of the components is part by mass.

In Table 1, the component 5 and the component 6 are as described below.

Sumidur (registered trademark) 44V40: polymethylene polyphenyl polyisocyanate, NCO concentration: 31.0% by mass, manufactured by Sumika Covestro Urethane Co., Ltd.

Duranate (registered trademark) TKA-100: an isocyanurate-modified product of hexamethylene diisocyanate, NCO concentration: 21.7% by mass, manufactured by Asahi Kasei Corporation Desmodur (registered trademark) Z 4470 BA: a butyl acetate solution of an isocyanurate-modified product of isophorone diisocyanate, a solid content concentration of 70% by mass, NCO concentration: 11.9% by mass, manufactured by Sumika Covestro Urethane Co., Ltd.

Light Acrylate (registered trademark) DCP-A: tricyclodecanedimethanol diacrylate, a molecular weight of 304, manufactured by Kyoeisha Chemical Co., Ltd.

Laromer (registered trademark) PR9000: the compound of Formula (1), a molecular weight of 736.82, manufactured by BASF Karenz (registered trademark) MOI-EG: 2-(2-methacryloyloxyethyloxy)ethyl isocyanate, a molecular weight of 199.206, manufactured by Showa Denko K.K.

TABLE 1

| | | Example 1 | Example 2 | Example 3 | Example 4 |
|---|---|---|---|---|---|
| Component 1 | Maleic anhydride graft-modified product of propylene-butene copolymer | 11.48 | 11.48 | 11.52 | 11.52 |
| Component 2 | Laromer (registered trademark) PR9000 | | | 1.60 | |
| | Karenz (registered trademark) MOI-EG | | | | |
| Mixture of component 2, component 4, component 5, and component 6 | Ethyl acetate solution of 78.8% by mass oligomer 1 | 2.38 | | | |
| | Ethyl acetate solution of 81.4% by mass oligomer 2 | | 1.95 | | |
| Mixture of component 2, component 5, and component 6 | Oligomer 3 | | | | |
| | Oligomer 4 | | | | 1.60 |
| Component 3 | 2,4,6-Trimethylbenzoyldiphenylphosphine oxide | 0.086 | 0.074 | 0.074 | 0.086 |
| | 2-Hydroxy-2-methyl-propiophenone | 0.047 | 0.040 | 0.040 | 0.047 |
| | Oligomer of 2-hydroxy-1-(4-isopropenylphenyl)-2-methylpropan-1-one | 0.039 | 0.034 | 0.034 | 0.039 |
| | Mesityl (phenyl) ketone | 0.015 | 0.013 | 0.013 | 0.013 |
| Component 5 | Sumidur (registered trademark) 44V40 | 0.16 | 0.16 | 0.16 | 0.16 |
| | Duranate (registered trademark) TKA-100 | 2.26 | 2.26 | 2.27 | 2.27 |
| Mixture of component 4 and component 5 | Desmodur (registered trademark) Z 4470 BA | 1.74 | 1.74 | 1.75 | 1.75 |
| Component 6-1 | Light Acrylate (registered trademark) DCP-A | | | | |
| Component 7 | Dibutyltin dilaurate | 0.25 | 0.25 | 0.25 | 0.25 |
| Component 4 | Methylcyclohexane | 58.95 | 59.17 | 59.39 | 59.39 |
| | Ethyl acetate | 22.58 | 22.81 | 22.89 | 22.89 |
| Solid content concentration (% by mass) | | 17.43 | 17.12 | 17.19 | 15.86 |
| Viscosity of composition at 25° C. (mPa · s) | | 35 | 36 | 32 | 32 |
| Ratio of total number of isocyanato groups (—NCO groups) to total number of carboxy groups (—COOH groups) in composition ([NCO]/[COOH]) | | 9.4 | 8.2 | 9.6 | 9.5 |
| Ratio of total number of isocyanato groups to total number of (meth)acryloyl groups in composition | | 9.9 | 6.0 | 5.1 | 10.1 |

| | | Example 5 | Example 6 | Example 7 | Comparative Example 1 |
|---|---|---|---|---|---|
| Component 1 | Maleic anhydride graft-modified product of propylene-butene copolymer | 11.52 | 11.48 | 11.48 | 12.99 |
| Component 2 | Laromer (registered trademark) PR9000 | | 1.64 | | |
| | Karenz (registered trademark) MOI-EG | | | 4.00 | |
| Mixture of component 2, component 4, component 5, and component 6 | Ethyl acetate solution of 78.8% by mass oligomer 1 | | | | |
| | Ethyl acetate solution of 81.4% by mass oligomer 2 | | | | |
| Mixture of component 2, component 5, and component 6 | Oligomer 3 | | | | |
| | Oligomer 4 | 1.60 | | | |
| Component 3 | 2,4,6-Trimethylbenzoyldiphenylphosphine oxide | 0.086 | 0.086 | 0.086 | |
| | 2-Hydroxy-2-methyl-propiophenone | 0.047 | 0.047 | 0.047 | |
| | Oligomer of 2-hydroxy-1-(4-isopropenylphenyl)-2-methylpropan-1-one | 0.039 | 0.039 | 0.039 | |
| | Mesityl (phenyl) ketone | 0.013 | 0.015 | 0.015 | |

TABLE 1-continued

| | | | | | |
|---|---|---|---|---|---|
| Component 5 | Sumidur (registered trademark) 44V40 | 0.16 | | 0.16 | 0.19 |
| | Duranate (registered trademark) TKA-100 | 2.27 | | 2.26 | |
| Mixture of component 4 and component 5 | Desmodur (registered trademark) Z 4470 BA | 1.75 | | 1.74 | 6.64 |
| Component 6-1 | Light Acrylate (registered trademark) DCP-A | | | 1.87 | |
| Component 7 | Dibutyltin dilaurate | 0.25 | 0.25 | 0.25 | 0.29 |
| Component 4 | Methylcyclohexane | 59.39 | 58.95 | 58.95 | 58.91 |
| | Ethyl acetate | 22.89 | 23.08 | 23.08 | 23.09 |
| Solid content concentration (% by mass) | | 15.86 | 17.63 | 17.43 | 17.74 |
| Viscosity of composition at 25° C. (mPa · s) | | 32 | 36 | 31 | 37 |
| Ratio of total number of isocyanato groups (—NCO groups) to total number of carboxy groups (—COOH groups) in composition ([NCO]/[COOH]) | | 8.3 | 10.2 | 7.2 | 7.2 |
| Ratio of total number of isocyanato groups to total number of (meth)acryloyl groups in composition | | 5.4 | 1.0 | 1.4 | — |

The acid-modified polyolefin (component 1) having the following physical properties was used.

Acid-Modified Polyolefin Used

Type: a maleic anhydride graft-modified product of a propylene-butene copolymer
Acid value: 12.6 mg-KOH/g
Melting point: 80° C.
Melting heat quantity: 25 J/g
The copolymerization ratio (molar ratio) of propylene and butene, propylene:butene, was 78:22, and the weight average molecular weight (Mw) and the number average molecular weight (Mn) were 110,000 (Mw) and 58,000 (Mn), respectively.

Measurement Method of Acid Value

Measurement was performed in accordance with JIS K0070: 1992.

Measurement of Melting Point

The melting point was determined by the method in accordance with JIS K7121 (1987) "Testing Methods for Transition Temperatures of Plastics". For the measurement, a DSC (differential scanning calorimeter) (model DSC-60A) manufactured by Shimadzu Corporation was used to perform differential scanning calorimetry at a temperature increase rate of 10° C./min, and the resulting melting peak temperature was regarded as "melting point".
More detailed measurement conditions are as follows: a powder sample was placed and heated from room temperature to 180° C. at a temperature increase rate of 10° C./min and was maintained at a high temperature of 180° C. for 5 minutes to be melted; next, the sample was cooled to −30° C., then was maintained at −30° C. for 5 minutes, and was heated at a temperature increase rate of 10° C./min; and the melting peak temperature was thus determined.

Measurement of Melting Heat Quantity

Measurement was performed in the condition described in the above melting point measurement, and the melting heat quantity was determined from an area surrounded by the extended line of the base line and a melting peak.
(Measurement Method of Copolymerization Ratio (Molar Ratio) of Propylene and Butene)
$^{13}$C NMR measurement (solvent: CDCl$_3$) was performed, and the resulting data were analyzed by the following method.

Analysis method: in a $^{13}$C NMR spectrum, the peak at 34.0 ppm is derived from methine carbons in polybutene, the peaks at 27.0 ppm to 28.0 ppm are derived from methylene carbons of the side chain in polybutene and from methine carbons in polypropylene. Hence, the integral ratio of the peak at 34.0 ppm was divided by the integral ratio of the peaks at 27.0 ppm to 28.0 ppm, and the calculated value was multiplied by 100 to give a copolymerization ratio (% by mole) of butene. The butene copolymerization ratio calculated as above was subtracted from 100 to give the copolymerization ratio (% by mole) of propylene.

Measurement Method of Weight Average Molecular Weight and Number Average Molecular Weight The weight average molecular weight and the number average molecular weight were determined by gel permeation chromatography (hereinafter referred to as "GPC") in terms of polystyrene.
Measurement was performed in the following conditions, and (STANDARD SM-105) was used as the polystyrene standard.
Apparatus: HPLC unit HSS-2000 manufactured by JASCO Corporation
Column: Shodex column LF-805 L×3 (in series)
Mobile phase: tetrahydrofuran
Flow rate: 1.0 mL/min
Detector: RI-2031Plus manufactured by JASCO Corporation
Oven temperature: 40.0° C.
Sample amount: 100 µL in a sample loop
Sample concentration: adjusted to about 0.1% by mass Liquidity Evaluation of Composition for Adhesives Viscosity A Brookfield rotational viscometer (LVDV-2+Pro viscometer manufactured by Brookfield) and a small sample adapter model (spindle/chamber: SC4 18/13RP) were used to determine the viscosity of a composition for adhesives at a temperature of 25.0° C. and a rotation rate of 20 rpm. The results are listed in Table 1.

Preparation of Test Piece

An aluminum roll of aluminum foil (width: 35 cm, thickness: 40 µm) having a corrosion prevention treatment (chemical conversion treatment) layer on a surface was set to a gravure printing machine, next a composition for adhesives was applied onto the corrosion prevention treatment (chemical conversion treatment) layer face of the aluminum foil by gravure printing, and then the coated aluminum foil was passed through a hot air drying furnace at 120° C. to vaporize the solvent.

Next, a cast polypropylene (a thickness of 80 μm, hereinafter referred to as "CPP") as a thermally fusible film for a sealant layer and the coated aluminum foil passed through the hot air drying furnace were passed between two rollers (one was a rubber roller without heat, and the other was a metal roller heated at 80° C.), and the coated face of the aluminum foil was bonded to the CPP. The CPP and the aluminum foil were passed between the rollers at a pressure of 0.5 MPa and a speed of 8 m/min.

Next, the CPP face of the bonded multi-layered film was irradiated with light by using an ultraviolet irradiation apparatus at an irradiation intensity of 600 mJ (365 nm), and then the multi-layered film was wound into a roll by using two rollers (one was a rubber roller without heat, and the other was a metal roller heated at 95° C.). The multi-layered film was passed between the rollers at a pressure of 0.5 MPa and a speed of 8 m/min. The resulting roll-like multi-layered film was stored in a circulating hot air oven at 50° C. for 12 hours or 24 hours, and then the center portion having a width of 19 cm in the laminated film having a width of 35 cm was used to prepare a strip-shaped test piece.

Evaluation of Test Piece

The test piece prepared by the above method was used to perform the following evaluations.

Evaluation of Adhesiveness

Normal Temperature Peel Strength

The test piece was cut into 15 mm width, and the normal temperature peel strength between the aluminum foil and the CPP (a measurement temperature of 25° C.) was determined in accordance with JIS K6854-3: 1999 by T-Peel Test (a tensile speed of 100 mm/min). The results are listed in Table 2.

Hot Peel Strength

The test piece was cut into 15 mm width, and the hot peel strength between the aluminum foil and the CPP (a measurement temperature of 85° C.) was determined in a similar manner to the above by T-Peel Test (a tensile speed of 100 mm/min). The results are listed in Table 2.

Anti-Electrolytic Solution Property

Ethylene carbonate and diethyl carbonate were mixed at 1:1 (volume ratio), then lithium hexafluorophosphate was added at a concentration of 1 mol/L, and the resulting mixture was used as an electrolytic solution.

The test piece was immersed in the electrolytic solution at 85° C. for 24 hours or a week, and then the normal temperature peel strength between the aluminum foil and the CPP (measurement temperature 25° C.) was determined in a similar manner to the above by T-Peel Test (a tensile speed of 100 mm/min). The results are listed in Table 2.

TABLE 2

| | Storage time in circulating hot air oven at 50° C. | Unit | Composition of Example 1 | Composition of Example 2 | Composition of Example 3 | Composition of Example 4 |
|---|---|---|---|---|---|---|
| Normal temperature peel strength | 12 hours | N/15 mm | 28.2 | 27.2 | 28.7 | 28.2 |
| | 24 hours | N/15 mm | 28.2 | 27.2 | 28.8 | 28.2 |
| Hot peel strength | 12 hours | N/15 mm | 8.0 | 7.1 | 8.0 | 8.0 |
| | 24 hours | N/15 mm | 8.3 | 7.7 | 8.3 | 8.3 |
| Normal temperature peel strength after immersion in electrolytic solution for 24 hours | 12 hours | N/15 mm | 14.3 | 16.1 | 16.8 | 16.1 |
| | 24 hours | N/15 mm | 16.1 | 16.1 | 16.8 | 16.2 |
| Normal temperature peel strength after immersion in electrolytic solution for a week | 12 hours | N/15 mm | 15.5 | 15.3 | 15.0 | 15.0 |
| | 24 hours | N/15 mm | 15.4 | 13.6 | 14.5 | 14.0 |

| | Storage time in circulating hot air oven at 50° C. | Unit | Composition of Example 5 | Composition of Example 6 | Composition of Example 7 | Composition of Comparative Example 1 |
|---|---|---|---|---|---|---|
| Normal temperature peel strength | 12 hours | N/15 mm | 28.3 | 28.3 | 26.4 | 26.0 |
| | 24 hours | N/15 mm | 28.3 | 28.3 | 26.7 | 26.7 |
| Hot peel strength | 12 hours | N/15 mm | 7.4 | 7.1 | 8.3 | 8.0 |
| | 24 hours | N/15 mm | 8.0 | 7.7 | 7.8 | 7.8 |
| Normal temperature peel strength after immersion in electrolytic solution for 24 hours | 12 hours | N/15 mm | 16.1 | 16.1 | 10.6 | 6.4 |
| | 24 hours | N/15 mm | 16.3 | 16.1 | 14.5 | 9.3 |
| Normal temperature peel strength after immersion in electrolytic solution for a week | 12 hours | N/15 mm | 15.0 | 14.8 | 12.1 | 11.9 |
| | 24 hours | N/15 mm | 14.0 | 13.1 | 10.4 | 9.5 |

As illustrated in Table 2, the compositions for adhesives in Examples 1 to 7 had such a sufficient anti-electrolytic solution property that the time-dependent reduction of the adhesive strength between the aluminum foil layer and the sealant layer by the electrolytic solution was suppressed over a long time.

Evaluation of Outer Package Material

Onto one face of an aluminum foil having a thickness of 40 μm, a urethane resin adhesive (first adhesive layer) was applied with a gravure roller and was dried by heating. Then, on the adhesive face, a biaxially stretched nylon film having a thickness of 25 μm was laminated as the base material layer to give a laminated film. On the other face of the aluminum foil, chemical conversion treatment was performed.

On the aluminum foil face, a second adhesive layer and a sealant layer were stacked in a similar process to the above method described in Preparation of test piece except that the laminated film with the biaxially stretched nylon film (base material layer) was used in place of the aluminum foil having the corrosion prevention treatment (chemical conversion treatment) layer on a surface, giving a roll-like multi-layered film. Even when the multi-layered films prepared by using the compositions for adhesives in Examples 1 to 7 as the second adhesive layer were immersed in the electrolytic solution used in the evaluation of anti-electrolytic solution property at 85° C. for a week, troubles such as peeling of the adhesive face were not observed.

INDUSTRIAL APPLICABILITY

The outer package material for electricity storage devices of the present invention can be used, for example, as an outer package material for batteries such as lithium-ion batteries.

REFERENCE SIGNS LIST 1 outer package material for batteries
2 base material layer
3 sealant layer
4 aluminum foil layer
5 first adhesive layer
6 second adhesive layer

The invention claimed is:

1. A composition for adhesives, the composition being used to form a second adhesive layer in an outer package material for electricity storage devices, the outer package material having a structure in which at least a base material layer, a first adhesive layer, a metal foil layer, the second adhesive layer, and a sealant layer are stacked in sequence, the composition comprising an isocyanato group, a (meth) acryloyl group, a component 1, a component 3, and a component 4, wherein
the component 1 is an acid-modified polyolefin, the component 3 is an active energy ray polymerization initiator, and the component 4 is a solvent.

2. A composition for adhesives, the composition being used to form a second adhesive layer in an outer package material for electricity storage devices, the outer package material having a structure in which at least a base material layer, a first adhesive layer, a metal foil layer, the second adhesive layer, and a sealant layer are stacked in sequence, the composition comprising a component 1, a component 2, a component 3; and a component 4, wherein
the component 1 is an acid-modified polyolefin, the component 2 is a compound having an isocyanato group and a (meth)acryloyl group in a molecule, the component 3 is an active energy ray polymerization initiator, and the component 4 is a solvent.

3. The composition for adhesives according to claim 2, wherein the component 2 is a reaction product by reaction of an isocyanato group of an isocyanurate-modified product of a diisocyanate compound with an alcoholic hydroxy group of a (meth)acryloyl-containing compound having the alcoholic hydroxy group.

4. The composition for adhesives according to claim 2, wherein a total number of isocyanato groups and (meth) acryloyl groups in a molecule of the component 2 is 3 or more.

5. The composition for adhesives according to claim 2, further comprising a component 5, wherein
the component 5 is a compound having a plurality of isocyanato groups in a molecule, the compound being other than the component 2.

6. The composition for adhesives according to claim 2, further comprising a component 6, wherein
the component 6 is a compound having a plurality of radically polymerizable functional groups in a molecule, the compound being other than the component 2.

7. The composition for adhesives according to claim 6, wherein the radically polymerizable functional group is a (meth)acryloyl group.

8. The composition for adhesives according to claim 1, wherein the component 1 is a maleic anhydride-modified polyolefin.

9. The composition for adhesives according to claim 1, wherein the component 1 is an acid-modified product of a copolymer of propylene and an olefin other than propylene.

10. The composition for adhesives according to claim 1, wherein the component 1 has a melting point of 75° C. or more and 90° C. or less.

11. The composition for adhesives according to claim 1, further comprising a component 7, wherein the component 7 is a reaction catalyst for facilitating a reaction of an isocyanato group.

12. The composition for adhesives according to claim 1, wherein a ratio of a total number of isocyanato groups to a total number of (meth)acryloyl groups contained in the composition for adhesives is 3.0 or more and 15.0 or less.

13. The composition for adhesives according to claim 1, wherein a proportion of an amount of the component 1 is 60% by mass or more and 96% by mass or less where an amount calculated by subtracting a total amount of the component 3 and the component 4 from a total amount of the composition for adhesives is 100% by mass, and a proportion of an amount of the component 3 is 0.05% by mass or more and 10% by mass or less where an amount calculated by subtracting an amount of the component 4 from the total amount of the composition for adhesives is 100% by mass.

14. The composition for adhesives according to claim 1, wherein a proportion of an amount of the component 1 is 56% by mass or more and 92% by mass or less, a proportion of an amount of the component 3 is 0.05% by mass or more and 10% by mass or less, and a proportion of an amount calculated by subtracting an amount of the component 1, the component 3, and the component 4 from a total amount of the composition for adhesives is 4% by mass or more and 50% by mass or less where an amount calculated by subtracting an amount of the component 4 from a total amount of the composition for adhesives is 100% by mass.

15. The composition for adhesives according to claim 1, wherein a proportion of an amount of the component 4 is 75% by mass or more and 95% by mass or less where a total amount of the composition for adhesives is 100% by mass.

16. An outer package material for electricity storage devices, the outer package material having a structure in which at least a base material layer, a first adhesive layer, a metal foil layer, a second adhesive layer, and a sealant layer are stacked in sequence, wherein
the second adhesive layer includes a polymer of the composition for adhesives according to claim 1.

17. The outer package material for electricity storage devices according to claim 16, wherein a corrosion prevention treatment layer is provided on at least a face of the metal foil layer proximate to the sealant layer, and the sealant layer includes a polyolefin resin.

18. A method for producing an outer package material for electricity storage devices, the outer package material having a structure in which at least a base material layer, a first adhesive layer, a metal foil layer, a second adhesive layer, and a sealant layer are stacked in sequence, the method comprising:
applying the composition for adhesives according to claim 1 onto one or both of a face of the metal foil layer proximate to the sealant layer and a face of the sealant layer proximate to the metal foil layer;
partially or completely removing the solvent from the applied composition for adhesives; and then
polymerizing the composition for adhesives from which the solvent has been partially or completely removed, by irradiation with an active energy ray, to form a polymer layer as the second adhesive layer.

19. A method for producing an outer package material for electricity storage devices, the outer package material having a structure in which at least a base material layer, a first adhesive layer, a metal foil layer, a second adhesive layer, and a sealant layer are stacked in sequence, a corrosion prevention treatment layer being provided on at least a face of the metal foil layer proximate to the sealant layer, the sealant layer including a polyolefin resin, the method comprising:
applying the composition for adhesives according to claim 1 onto one or both of a face of the metal foil layer proximate to the sealant layer and a face of the sealant layer proximate to the metal foil layer;
partially or completely removing the solvent from the applied composition for adhesives; then
polymerizing the composition for adhesives from which the solvent has been partially or completely removed, by irradiation with an active energy ray, to form a polymer layer as the second adhesive layer; and then
exposing the polymer layer to an atmosphere at 30° C. or more and 70° C. or less for 1 hour or more.

20. A method for producing an outer package material for electricity storage devices, the outer package material having a structure in which at least a base material layer, a first adhesive layer, a metal foil layer, a second adhesive layer, and a sealant layer are stacked in sequence, a corrosion prevention treatment layer being provided on at least a face of the metal foil layer proximate to the sealant layer, the sealant layer including a polyolefin resin, the method comprising:
applying the composition for adhesives according to claim 2 onto one or both of a face of the metal foil layer proximate to the sealant layer and a face of the sealant layer proximate to the metal foil layer;
partially or completely removing the solvent from the applied composition for adhesives; then
polymerizing the composition for adhesives from which the solvent has been partially or completely removed, by irradiation with an active energy ray, to form a polymer layer as the second adhesive layer; and then
exposing the polymer layer to an atmosphere at 30° C. or more and 70° C. or less for 1 hour or more.

* * * * *